United States Patent
Romahn et al.

US008026300B2

(10) Patent No.: US 8,026,300 B2
(45) Date of Patent: Sep. 27, 2011

(54) AQUEOUS RESIN DISPERSION, PROCESS OF MAKING THEREOF, AND PRODUCT THEREOF

(75) Inventors: Carsten Romahn, Iserlohn (DE); Michael Schwab, Iserlohn (DE); Gunda Kuhlmann, Hamm (DE); Peter Stracke, Iserlohn (DE)

(73) Assignee: Momentive Specialty Chemicals Inc., Columbus, OH (US)

( * ) Notice: Subject to any disclaimer, the term of this patent is extended or adjusted under 35 U.S.C. 154(b) by 0 days.

(21) Appl. No.: 12/226,159

(22) PCT Filed: Apr. 11, 2007

(86) PCT No.: PCT/EP2007/003198
§ 371 (c)(1),
(2), (4) Date: Dec. 16, 2008

(87) PCT Pub. No.: WO2007/118645
PCT Pub. Date: Oct. 25, 2007

(65) Prior Publication Data
US 2009/0264559 A1  Oct. 22, 2009

(30) Foreign Application Priority Data
Apr. 13, 2006 (DE) .......... 10 2006 017 891

(51) Int. Cl.
C08K 5/05 (2006.01)
C08K 5/151 (2006.01)
C08K 5/16 (2006.01)
C08K 5/00 (2006.01)
C08L 1/00 (2006.01)
C08L 5/00 (2006.01)
C08L 3/00 (2006.01)
C08L 63/00 (2006.01)
C08G 73/00 (2006.01)
C08F 220/04 (2006.01)

(52) U.S. Cl. ........... 524/1; 524/27; 524/61; 524/87; 524/107; 524/284; 524/359; 524/379; 524/391; 523/402; 523/426; 523/447; 523/461

(58) Field of Classification Search ........... 523/447
See application file for complete search history.

(56) References Cited

U.S. PATENT DOCUMENTS

| | | | | |
|---|---|---|---|---|
| 3,491,092 A | * | 1/1970 | Wedemeyer Karlfried et al. | 544/73 |
| 4,315,766 A | * | 2/1982 | Hamprecht et al. | 504/223 |
| 4,507,428 A | * | 3/1985 | Higginbottom et al. | 524/596 |
| 4,524,107 A | * | 6/1985 | Marchetti et al. | 428/413 |
| 4,607,091 A | | 8/1986 | Schreiber | |
| 5,118,323 A | * | 6/1992 | Lim et al. | 8/405 |
| 6,080,813 A | * | 6/2000 | Wendel et al. | 524/734 |
| 6,376,080 B1 | * | 4/2002 | Gallo | 428/413 |
| 2003/0038031 A1 | * | 2/2003 | Nojiri et al. | 204/502 |
| 2003/0091800 A1 | | 5/2003 | Zhang | |

FOREIGN PATENT DOCUMENTS

| | | |
|---|---|---|
| DE | 2323936 | 6/1973 |
| EP | 0019161 | 11/1980 |
| EP | 0458739 | 11/1991 |
| EP | 1046683 | 10/2000 |
| JP | 07329090 A * | 12/1995 |
| JP | 2004027000 A * | 1/2004 |

OTHER PUBLICATIONS

Air Products and Chemicals,Inc, Material Safety Data Sheet for SURFYNOL TG Surfactant, Nov. 26, 2003, Air Products and Chemicals, Inc.*
English machine translation of JP Patent Pub No. 07-329090 A, Tonoki et al, Dec. 19, 1995.*
English machine translation of JP Patent Pub No. 2004-027000 A, Kashiwabara et al, Jan. 29, 2004.*
English translation of JP 07-329090 A, Tonoki et al, Dec. 19, 1995.*
English translation of JP 2004-027000 A, Kashiwabara et al, Jan. 29, 2004.*
English machine translation of JP 07-329090 A, Tonoki et al, Dec. 19, 1995.*

* cited by examiner

*Primary Examiner* — Mark Eashoo
*Assistant Examiner* — David Karst

(57) ABSTRACT

The invention relates to watery resin dispersions, a process for their manufacture, and a product. To make available resin dispersions that do not pollute the environment during their processing, while simultaneously generating products that have a high glass transition temperature, it is suggested that the watery resin dispersion contain at least components (I), (II) and (III), whereby $R_1$: unsubstituted single or polynuclear aromatic rest or with amino groups and/or cyano groups and/or nitrile groups and/or with saturated and/or unsaturated aliphatic $C_2$ to $C_{12}$ carbon chains substituted single or polynuclear aromatic rests $R_2$, $R_3$ and $R_4$: hydrogen, alkyl residue group with up to 15 C atoms or aromatic rest whereby $R_2$, $R_3$ and $R_4$ can be equal to or different from each other, (II) is a co-dispersion agent based on epoxide resins and/or novolak resins and (II) one surfactant.

14 Claims, No Drawings

AQUEOUS RESIN DISPERSION, PROCESS OF MAKING THEREOF, AND PRODUCT THEREOF

RELATED APPLICATION DATA

This application claims the benefit of German Patent Application No. 10 2006 017 891.2 filed Apr. 13, 2006, the entire contents of which are hereby incorporated by reference.

FIELD OF THE INVENTION

This invention relates to an aqueous resin dispersion, to a process for producing it and to a product.

BACKGROUND OF THE INVENTION

The production of impregnations of building construction products utilizes resin dispersions which have hitherto generally consisted of aqueous resoles or acrylate dispersions. Dispersions based on resoles are thinnable with water, but eliminate formaldehyde on curing and hence fabrication can only be carried out in plant specifically designed for that purpose. Acrylate dispersions can be cured without emission of environmentally harmful substances, but the cured products have a low glass transition temperature and an unfavorable performance in fire.

Resins based on benzoxazines are known from the prior art. DE 23 23936, for instance, states that such compounds are obtainable by a reaction of phenols with primary amines and formaldehyde wherein either the phenols have at least two hydroxyl-substituted aromatic ring systems per molecule or the amines have at least two primary amino groups per molecule. Such resins have the particular advantage that they are crosslinkable without addition of further curing agents, which has the advantage of avoiding environmentally harmful elimination products which can escape. However, coating with resin dispersions based on benzoxazines does require a solvent, resulting in emission problems.

It is an object of the present invention to provide resin dispersions whose processing avoids the release of environmentally burdensome materials and at the same time gives rise to products having a high glass transition temperature.

DETAILED DESCRIPTION OF THE INVENTION

We have found that this object is achieved according to the present invention by providing an aqueous resin dispersion comprising at least the constituents (I), (II) and (III):

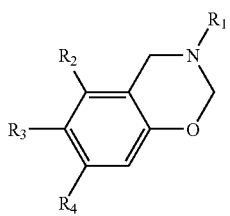
(I)

where
$R_1$:
a mono- or polynuclear aromatic radical unsubstituted or substituted with amino groups and/or cyano groups and/or nitrile groups and/or with saturated and/or unsaturated aliphatic $C_2$ to $C_{12}$ carbon chains $R_2$, $R_3$ and $R_4$: hydrogen, alkyl radicals having up to 15 carbon atoms or an aromatic radical, wherein $R_2$, $R_3$ and $R_4$ may be the same or different from one another, (II) a codispersant based on epoxy resins and/or novolak resins
and
(II) a surfactant.

Said constituent (I)

is obtainable, as already mentioned at the beginning, by a reaction of phenols with primary amines and formaldehyde wherein either the phenols have at least two hydroxyl-substituted aromatic ring systems per molecule or the amines have at least two primary amino groups per molecule.

$R_1$ may be by reason of the high stability a mono- or polynuclear aromatic radical unsubstituted or substituted with amino groups and/or cyano groups and/or nitrile groups and/or with saturated and/or unsaturated aliphatic $C_2$ to $C_{12}$ carbon chains. Preferably, $R_1$ is an unsubstituted phenyl radical, since corresponding compounds are thermally stable and inexpensive.

$R_2$, $R_3$ and $R_4$ are hydrogen or alkyl radicals having up to 15 carbon atoms or an aromatic radical, and $R_2$, $R_3$ and $R_4$ may be the same or different from one another. Alkyl radicals having 8 to 15 carbon atoms are preferred, since they endow the material with high flexibility. Compounds having alkyl radicals >10 carbon atoms have lower toxicity and therefore are additionally of advantage.

Owing to the straightforward availability of the raw materials, it is particularly preferable when said constituent (I) is a reaction product of bisphenol A, aniline and formaldehyde.

Constituent (II) comprises a codispersant based on epoxy resins and/or novolak resins. Codispersants can be incorporated in the network essentially emissionlessly and/or contribute to network construction. As epoxy resin it is preferably to use a low molecular weight epoxy resin having an average molar mass of 200 to 1000.

Useful epoxy resins preferably include any epoxy compounds having at least two epoxy groups per molecule and a melting range below 85° C. Preference is given to epoxy compounds that are liquid at room temperature, such as diglycidyl ethers of bisphenols or advanced resins based on bisphenol A diglycidyl ethers. Of especial preference are low viscosity resins such as epoxy resins based on cycloolefins or tetraglycidyldianiline or else mixtures of solid epoxy resins such as, for example, epoxidized novolaks with so-called reactive diluents. The epoxy resins may optionally be modified with other polymers such as, for example, polyesters, acrylates, silicone polymers or polyvinyl derivatives.

The novolaks used are copolymers of a phenolic compound and an aldehyde that are prepared in an acidic medium using a ratio of phenolic compound:aldehyde which is preferably in the range from 1:0.4 to 1:0.8. These copolymers can be prepared monomerlessly. In the case of a ratio greater than 1:0.8, the resulting novolak is too viscous and in the case of a ratio of less than 1:0.4 the resins are too water-soluble and therefore more difficult to disperse.

As phenolic compounds there may be used one or polynuclear phenols or mixtures of the class of compounds mentioned, specifically both mono- or polynuclear phenols. Examples thereof are phenol itself as a preferred variant, and also its alkyl-substituted homologs, such as o-, m- or p-cresol, xylenes or more highly alkylated phenols, also halogen-substituted phenols, such as chlorophenol and bromophenol, and polyfunctional phenols such as resorcinol or pyrocatechol, and also polynuclear phenols such as naphthols, bisphenol A or bisphenol F. Phenol, or the phenolic component, is reacted with aldehyde, in particular formaldehyde or a formaldehyde-yielding compound, to form the desired novolak. The novolaks may be modified with customary modifying agents, for example epoxy resins, rubbers, polyvinyl butyral and inorganic additives.

It is particularly preferable when the amount of codispersant is in the range from 30% to 60% by weight, based on the amount of constituent (I) used. In the case of more than 60% by weight, the network density becomes less satisfactory, or the glass transition temperature TG suffers. In the case of less than 30% by weight of codispersant, there are problems with production, and when a codispersant based on epoxy resins is used, chemical resistance deteriorates.

The resin dispersion of the present invention further includes a surfactant which, in the traditional sense, is a substance that has an effect on the surface tension of the interface between two phases. Not only cationic or anionic surfactants (such as, for example, the sodium salts of nonylphenol polyglycol ether sulfate, octylphenol polyglycol ether sulfate, fatty alcohol polyglycol ether sulfate) but also nonionic surfactants can be used.

It is preferable when the surfactant is a nonionic surfactant. A particularly advantageous effect will be obtained with nonionic surfactants such as castor oil ethoxylate, a hydrogenated castor oil ethoxylate, alkyl phenol ethoxylate, fatty alcohol ethoxylate, oleic acid ethoxylate, oxo process alcohol ethoxylate and/or fatty alcohol alkoxylate.

The amount of surfactant used is preferably in the range from 3% to 20% by weight and preferably in the range from 3% to 6% by weight, based on the amount of constituent (I) used. At less than 3% by weight of surfactant, the effect is not sufficient, and at more than 20% by weight the final properties of the cured product deteriorate.

The resin dispersion of the present invention may further comprise at least one stabilizer—preferably in a concentration of 0.2% to 2% by weight, based on the mass of the overall mixture—based on high molecular weight alcohols or else cellulose derivatives, starch, dextrin, polyacrylic acid and/or copolymeric salts thereof, poly-N-vinylmethylacetamide, polyvinyl alcohol, vinylpyrrolidone copolymers and/or Stimme protective colloids. The stability of the dispersion is enhanced in this way. It is particularly preferable when the stabilizer is methoxycellulose, since this stabilizer is effective at very low concentrations.

The resin dispersion of the present invention may also include further constituents such as substances which accelerate the curing reaction, for example Lewis acids or imidazoles in an amount of 0% to 1.5% by weight, based on the mass of the entire mixture. Of advantage are in turn imidazoles which, as well as the accelerating effect, also endow the accelerated dispersion with a high stability of several hours to days. More particularly, when a resin based on epoxy resins is used, as codispersant, it is preferable to add an imidazole.

The resin dispersion of the present invention may further include processing assistants in a concentration, preferably, of 0.05% to 3% by weight, based on the mass of the entire mixture, such as flow agents to improve filming, or else substances to fine-tune specific properties such as, for example, acrylate dispersions to enhance the flexibility. The use of ethylene glycol and/or polydimethylsiloxane may be mentioned by way of example.

The resin dispersion of the present invention preferably has a solids concentration of 25-30%.

The resin dispersion of the present invention can be produced by a process wherein at least the codispersant and the surfactant is mixed with the constituent (I) which is essentially in the melt. It is immaterial in this connection in which order and at which temperature the codispersant and the surfactant are added. It is also possible to admix further components such as, for example, the stabilizer and/or water immediately or temporally delayed.

Preference is given to a process comprising at least the following steps:
 a. adding at least the codispersant to said constituent (I) present essentially in the melt, and
 b. adding at least a surfactant and water or a mixture of at least a surfactant and water to the mixture obtained in step a).

The resin based on benzoxazines is melted at temperatures between 50 and 130° C. and the codispersant is added. To influence the viscosity of this mixture, a solvent may additionally be added to this mixture (for example at up to 10% by weight), if appropriate. Toluene can be used as a solvent for example. This mixture is admixed with the surfactant in combination or temporally delayed with water. The mixture may preferably be admixed at this point in time with the stabilizer alone or in combination with water. The temperatures of the constituents added may vary and may be harmonized with each other according to their solubilities for example.

The resin dispersion obtained may optionally be admixed with further components such as catalysts, film-formers, pigments or else flexibilizers. But it is also possible, where appropriate, to add one or more components in the course of the process steps a) and b).

The uncrosslinked resin dispersion of the present invention can be applied to textile, mineral, metallic or else plastics surfaces in the form of fibers, fibrous nonwoven webs, wovens, wools or smooth surfaces in a straightforward and uncomplicated manner, for example by brushing, spraying or blade coating. Drying operations may follow. During and also after crosslinking, no formaldehyde is released, which would be an environmental or more specifically an odor nuisance. The surface coating is more flame-resistant compared with coatings from acrylate dispersions. Furthermore, the coatings have high chemical and thermal stability and a higher TG.

EXAMPLE

The invention will now be more particularly described with reference to an illustrative embodiment:
200 g of a reaction product of bisphenol A, aniline and formaldehyde (bisphenol A benzoxazine resin) are melted at 100° C. together with 100 g of a low molecular weight EP resin (for example EPIKOTE 828) and 30 g of a hydrogenated castor oil ethoxylate. The melt is admixed with 400 ml of 1% solution of methoxycellulose added during 30 min with vigorous stirring. The result is a white dispersion which, after cooling to 25° C., is stable for at least 2 months.

The dispersion thus obtained is admixed with 1% by weight of 2-methylimidazole accelerant and processed within 24 h. For further characterization, a 200 μm thick film of the accelerated dispersion is applied to a glass plate, dried at 120° C. for 15 min and cured at 150° C. for a further 30 min. The cured film is transparent and gives no measurable reaction to attacks by water, ethanol and toluene and a slight reaction to acetone.

Compared with acrylate dispersions, the TG value of the resin dispersions of the present invention has been raised. An acrylate dispersion cured with 10% melamine resin has a TG value of 40° C., and an acrylate dispersion cured via carboxyl groups has a TG value of 60° C. The resin dispersions of the present invention, based on benzoxazines, have a TG value of 100° C. irrespective of the codispersant used.

We claim:

1. An aqueous resin dispersion comprising constituents (I) to (IV):

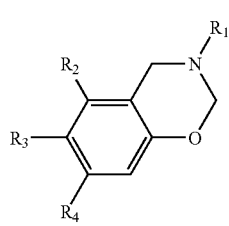

(I)

where
- $R_1$ is a mono- or polynuclear aromatic radical unsubstituted or substituted with amino groups and/or cyano groups and/or nitrile groups and/or with saturated and/or unsaturated aliphatic $C_2$ to $C_{12}$ carbon chains; and
- $R_2$, $R_3$ and $R_4$: hydrogen, alkyl radicals having up to 15 carbon atoms or an aromatic radical, wherein $R_2$, $R_3$ and $R_4$ may be the same or different from one another, (II) a codispersant based on epoxy resins, novolak resins, or their combinations, (III) a nonionic surfactant selected from castor oil ethoxylate, a hydrogenated castor oil ethoxylate, alkylphenol ethoxylate, fatty alcohol ethoxylate, oleic acid ethoxylate, oxo process alcohol ethoxylate or fatty alcohol alkoxylate, and (IV) a stabilizer based on cellulose derivatives, starch, dextrin, polyacrylic acid or copolymeric salts thereof, poly-N-vinylmethyl acetamide, polyvinyl alcohol, vinyl pyrrolidone copolymers or Stimme protective colloids.

2. The resin dispersion of claim 1, wherein $R_1$ of said constituent (I) is an unsubstituted phenyl radical.

3. The resin dispersion of claim 1 wherein $R_2$, $R_3$ and $R_4$ of said constituent (I) are alkyl radicals having 8 to 15 carbon atoms.

4. The resin dispersion of claim 1 wherein said constituent (I) is a reaction product of bisphenol A, aniline and formaldehyde.

5. The resin dispersion of claim 1 wherein the codispersant is a low molecular weight epoxy resin having an average molar mass of 200 to 1000.

6. The resin dispersion of claim 1 wherein the novolak resin is a phenol-formaldehyde resin prepared using a phenol:formaldehyde ratio in the range from 1:0.4 to 1:0.8.

7. The resin dispersion of claim 1 wherein the codispersant is in the range from 30% to 60% by weight, based on the amount of said constituent (I) used.

8. The resin dispersion of claim 1 wherein the surfactant is present in an amount in the range from 3% to 20% by weight based on the amount of said constituent (I) used.

9. The resin dispersion of claim 1 wherein the stabilizer is methoxy cellulose.

10. The resin dispersion of claim 1 wherein the stabilizer is present at a concentration of 0.2% to 2% by weight, based on the mass of the overall mixture.

11. A process for producing the aqueous resin dispersion of claim 1 comprising: mixing the codispersant and the surfactant with said constituent (I) which is essentially in the melt.

12. The process of claim 11 further comprising:
   a) adding at least the codispersant to said constituent (I), and
   b) adding at least a surfactant and water or a mixture of at least a surfactant and water to the mixture obtained in step a).

13. The process of claim 12 further comprising adding the stabilizer in step b).

14. A product having a crosslinked or uncrosslinked surface layer produced by applying the aqueous resin of claim 1.

* * * * *